(12) United States Patent
Yamaguchi et al.

(10) Patent No.: US 11,827,164 B2
(45) Date of Patent: Nov. 28, 2023

(54) WIRE HARNESS ROUTING MEMBER WITH CONTINUOUS WIRE EXTENDING FROM A BASE PLATE AND ARRANGED IN A FRONT OR REAR SPACE OF VEHICLE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Koji Yamaguchi, Yokkaichi (JP); Hiroki Hirai, Yokkaichi (JP); Ryoya Okamoto, Yokkaichi (JP); Taiji Yanagida, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 260 days.

(21) Appl. No.: 17/417,341

(22) PCT Filed: Dec. 13, 2019

(86) PCT No.: PCT/JP2019/048922
§ 371 (c)(1),
(2) Date: Jun. 22, 2021

(87) PCT Pub. No.: WO2020/137614
PCT Pub. Date: Jul. 2, 2020

(65) Prior Publication Data
US 2022/0073016 A1 Mar. 10, 2022

(30) Foreign Application Priority Data
Dec. 26, 2018 (JP) .................................. 2018-242445

(51) Int. Cl.
*B60K 1/04* (2019.01)
*B60R 16/02* (2006.01)
*H02G 3/04* (2006.01)

(52) U.S. Cl.
CPC ............ *B60R 16/0215* (2013.01); *B60K 1/04* (2013.01); *H02G 3/0406* (2013.01); *B60K 2001/0438* (2013.01)

(58) Field of Classification Search
CPC .................. B60R 16/0215; B60K 1/04; B60K 2001/0438; H02G 3/0406
(Continued)

(56) References Cited

U.S. PATENT DOCUMENTS 6,462,279 B1 * 10/2002 Serizawa ................. B60Q 3/51
174/72 A
9,524,811 B2 * 12/2016 Adachi ............... B60R 16/0215
(Continued)

FOREIGN PATENT DOCUMENTS

JP H07-105775 A 4/1995
JP H9-109799 A 4/1997
(Continued)

OTHER PUBLICATIONS

Mar. 3, 2020 International Search Report issued in International Patent Application No. PCT/JP2019/048922.

*Primary Examiner* — Timothy J Thompson
*Assistant Examiner* — Michael F McAllister
(74) *Attorney, Agent, or Firm* — Oliff PLC

(57) ABSTRACT

A wire harness routing member that routes a plurality of electric wires in a vehicle, the wire harness routing member including: a base plate that is arranged below a floor panel of a passenger compartment; and a wire harness having the plurality of electric wires fixed to the base plate, wherein at least one electric wire out of the plurality of electric wires is (Continued)

a continuous electric wire with a first end extending from a surface of the base plate or an edge of the base plate and being arranged in a front space of the vehicle or a rear space of the vehicle, and a second end extending from the edge of the base plate and being arranged in the front space of the vehicle or the rear space of the vehicle.

10 Claims, 8 Drawing Sheets

(58) Field of Classification Search
USPC .................................................. 174/72 A
See application file for complete search history.

(56) References Cited

U.S. PATENT DOCUMENTS

| 2012/0235471 A1* | 9/2012 | Tanahashi | B60K 1/04 307/9.1 |
| 2015/0217707 A1* | 8/2015 | Tanigaki | B60L 50/66 180/65.1 |
| 2016/0141586 A1* | 5/2016 | Fujii | H01M 50/503 429/99 |
| 2018/0072146 A1* | 3/2018 | Narisawa | B60K 1/04 |

FOREIGN PATENT DOCUMENTS

| JP | 2015-182655 A | 10/2015 |
| JP | 2017-175799 A | 9/2017 |

* cited by examiner

WIRE HARNESS ROUTING MEMBER WITH CONTINUOUS WIRE EXTENDING FROM A BASE PLATE AND ARRANGED IN A FRONT OR REAR SPACE OF VEHICLE

BACKGROUND

The technology disclosed in this specification relates to a wire harness routing member that routes a wire harness in a vehicle.

The art disclosed in JP 9-109799A has been known for example as a routing structure for a wire harness in a vehicle. This wire harness routing structure connects a plurality of wire harnesses through connectors and the like in a plurality of locations and routes the wire harnesses in the entire vehicle from the front space of the vehicle where the engine compartment and the like are situated, to the rear space.

SUMMARY

This type of wire harness routing structure is such that a core harness is routed within the passenger compartment, and a front harness and a rear harness are connected by connectors to the core harness by providing connectors and the like at the positions of through holes provided in front panels and rear panels that comprise the passenger compartment.

However, the connector connection locations are such that there is a fear that the connection points could wear due to the effects of vehicle vibrations and the like, and when the connection points wear, connection reliability between the various devices declines. In addition, through the above-described configuration, the work of providing through holes in each of the panels, the work of installing the connectors in the through holes and the work of connecting the connectors are necessary, and in addition, because installing seal members in the through holes is also necessary, the number of work procedures and the number of components increase significantly.

An exemplary aspect of the disclosure ensures connection reliability between devices and simplifying wire routing work.

A technology disclosed in this specification is a wire harness routing member that routes a plurality of electric wires in a vehicle, the wire harness routing member comprising a base plate that is arranged below a floor panel of a passenger compartment, and a wire harness having the plurality of electric wires fixed to the base plate, wherein at least one electric wire out of the plurality of wires is a continuous electric wire with a first end extending from a surface of the base plate or an edge of the base plate and being arranged in a front space of the vehicle or a rear space of the vehicle, and a second end extending from the edge of the base plate and being arranged in the front space of the vehicle or the rear space of the vehicle.

The continuous electric wire is configured to form a continuous first wire, the first end is arranged on the surface of the base plate and the second end extends from the edge of the base plate and is arranged in the front space of the vehicle or the rear space of the vehicle.

The continuous electric wire is configured to form a continuous second wire, the first and second ends extend from the edge of the base plate and are arranged in the front space or the rear space.

With such a wire harness routing member, a continuous electric wire or a first electric wire is continuously configured from the base plate position to the front space or rear space position. In addition, a continuous electric wire or a second electric wire is continuously configured from the front space position to the rear space position, or the continuous electric wire or the second electric wire is continuously configured from the front space to the front space via the base plate. That is, with such a configuration, for example, unlike wire harnesses connected by connectors at a plurality of locations, there is no risk of contact wear, and it is possible to prevent deterioration of connection reliability between devices.

Further, with the above configuration, since the continuous electric wire, the first electric wire or the second electric wire is fixed to the base plate arranged below the floor panel, there is no need to perform the work of providing a through hole for the floor panel, the work of installing a connector in the through hole, the work of connecting the connector, or the like, and it is possible to prevent the work hours and the number of components from increasing. As a result, it is possible to simplify routing work for the plurality of electric wires in the vehicle.

The wire harness routing member disclosed by this specification may also have the following configurations.

The plurality of electric wires may include a plurality of continuous electric wires, and the plurality of continuous electric wires may be fixed flat side-by-side so as to run along the surface of the base plate.

With such a configuration, since the plurality of continuous electric wires is fixed flat to the surface of the base plate, the area where the wire harness is routed can be reduced and placement space for the wire harness routing member can be further reduced, for example compared with the case where a bundle of electric wires obtained by bundling a plurality of continuous electric wires is fixed to the base plate.

The base plate may be a power storage cover of a power storage device assembled below the floor panel of the vehicle.

With such a configuration, a plurality of continuous electric wires can be fixed to the power storage cover of the power storage device assembled below the floor panel of the vehicle to route the wire harness in the vehicle. As a result, the number of components and space for arranging the wire harness can be reduced as compared with the case where the base plate is provided separately from the power storage device.

The power storage device may be provided with a plurality of power storage modules and the power storage cover member that collectively covers the plurality of power storage modules; the plurality of electric wires may include a plurality of the continuous electric wires; and the plurality of continuous electric wires may be fixed to the surface of the power storage cover member on the power storage module side.

With such a configuration, a wire harness having a plurality of continuous electric wires is routed in the power storage device, and consequently, for example compared to the case of a wire harness composed of a plurality of continuous electric wires being routed on the outside surface of the routing cover, it is possible to prevent other members from coming into contact with the plurality of continuous electric wires. In other words, it is possible to prevent the wire harness from being damaged due to contact with other members.

The power storage cover may be made of a conductive metal.

With such a configuration, the wire harness having a plurality of continuous electric wires is covered with a metal power storage cover, and consequently, it is possible for the wire harness to be electromagnetically shielded without the wire harness needing to be separately covered with a shield member such as braided wire. As a result, it is possible to suppress an increase in the number of components and man-hours for mounting the shield member, and it is possible to reduce the arrangement space of the wire harness routing member.

The power storage device may be assembled to a lower part of the vehicle frame of the vehicle, and when assembled on the vehicle frame, the power storage device may be arranged inward of a side portion of the vehicle frame.

For example, in the case of continuous electric wires that transmit electric power or signals that are important for operating the vehicle, if the continuous electric wires are broken, the vehicle cannot be operated. However, with such a configuration, since a plurality of continuous electric wires is fixed to the power storage cover of the power storage device arranged inward of the side portion of the vehicle frame, it is possible to prevent the continuous electric wires from being broken even if another vehicle collides with the vehicle from the side.

The wire harness may have at least one auxiliary electric wire arranged along a path different from the continuous electric wires so as to become a redundancy of the continuous electric wires.

When the continuous electric wires transmit electric power or signals that are important for operating the vehicle, if the continuous electric wire is broken, problems such as being unable to operate the vehicle can occur.

However, with such a configuration, auxiliary electric wires that are a redundancy of the continuous electric wires are arranged along a different path than the first electric wires, so even if the continuous electric wires are broken, it is possible with the auxiliary wires to secure the power and signals necessary to operate the vehicle.

The continuous electric wires extending from the base plate may be fixed to a holding member that extends along the routing path.

With such a configuration, before the wire harness routing member is arranged in the vehicle, the continuous electric wires can be arranged in advance along the wiring path by the holding member, so it is possible to improve electric wire routing workability with respect to the vehicle. In addition, because the continuous electric wires are reinforced by being fixed to the holding member, it is possible to prevent the continuous electric wires from being pulled and broken.

The holding member may have rigidity capable of maintaining shape.

With such a configuration, the shape of the continuous electric wires can be configured to match the shape of a three-dimensional wiring path of the continuous electric wires. In other words, by arranging the holding member with respect to the vehicle, the routing of the electric wires can be almost completed, so that the workability of routing the electric wires can be further improved.

The holding member may have a bendable end on the base plate side, and the continuous electric wires can be folded by bending the edge of the holding member in a state prior to being arranged in the vehicle.

The wire harness routing member that routes the wire harness from the front space to the rear space of the vehicle becomes very large. However, in order to convey the wire harness routing member, it is desirable that the wire harness be made smaller and less bulky, even if only a little.

However, with the above configuration, it is possible to bend the continuous electric wires extending from the storage cover by bending the bent portion of the holding member on the storage cover side to fold the continuous electric wires together with the holding member.

That is, in the state before the wire harness routing member is attached to the vehicle, the wire harness routing member can be reduced in size to almost the same size as the power storage cover, and hence it is possible to facilitate wire harness routing member conveyance work as compared, for example, with cases where the portion extending from the power storage cover cannot be folded.

With the technology disclosed in this specification, it is possible to ensure connection reliability between each device and to simplify electric wire routing work.

DETAILED DESCRIPTION OF EMBODIMENTS

An embodiment of technology disclosed in this specification will be described with reference to FIGS. 1-8.

In this embodiment, a vehicle C in which a wire harness routing member 10 is assembled is shown as an example.

The vehicle C comprises a metal vehicle frame 20, a body panel 30 mounted on the vehicle frame 20, and a power storage device 40 installed at a lower part of the vehicle frame 20, and the like. In the following description, the front-rear direction is based on the left-right direction in FIGS. 1 and 5, with the F side as the front side and the B side as the rear side. Furthermore, the left-right direction will be described with the left diagonal front side (L side) in FIGS. 2 and 5 as the left side and the right diagonal rear side (R side) as the right side.

Figure 2:
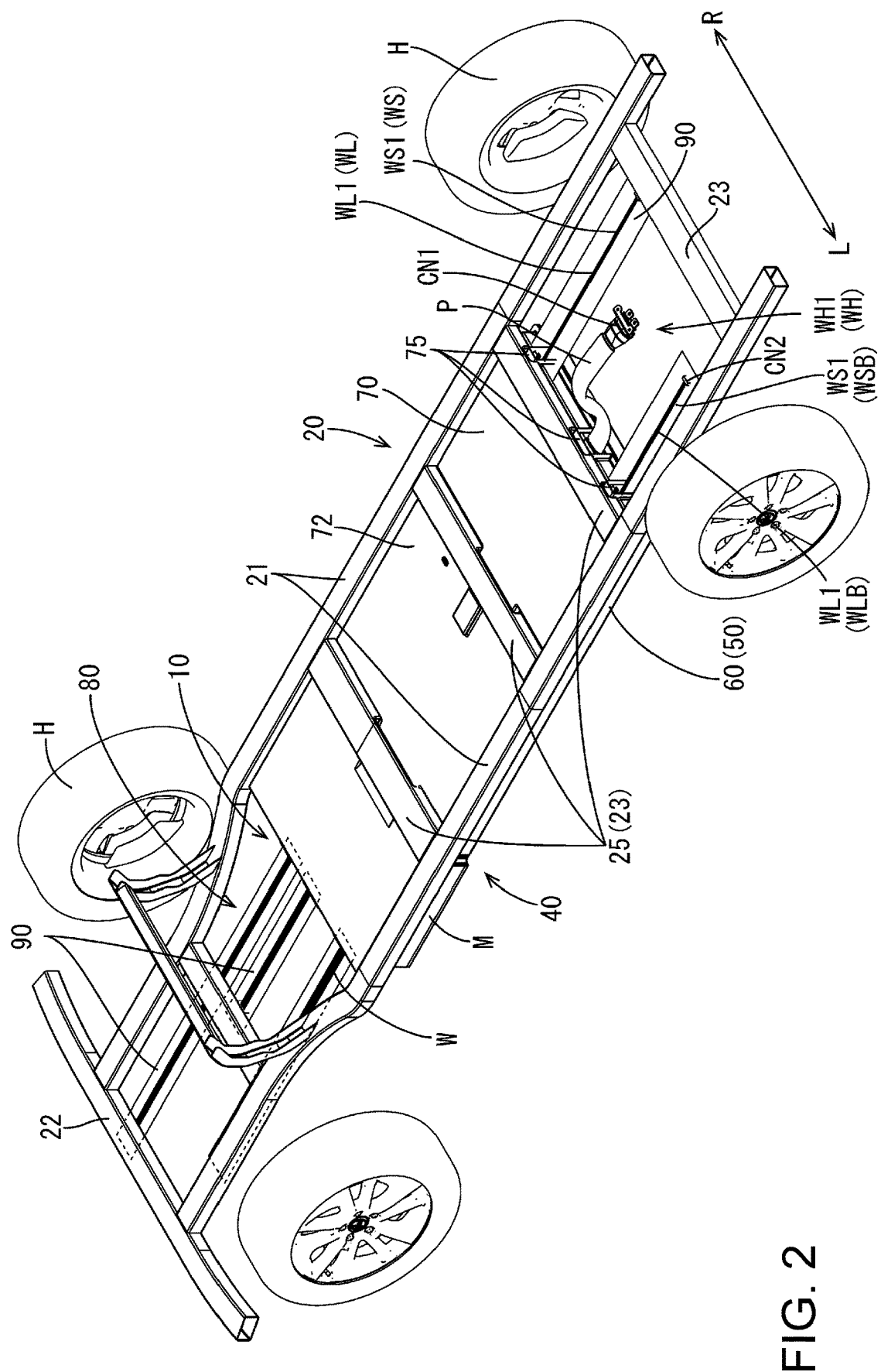
FIG. 2 is a perspective view showing a state in which a power storage device is attached to a vehicle frame.

As shown in FIG. 2, the vehicle frame 20 is formed in a ladder shape and is a so-called ladder frame comprising a pair of side frames 21 extending in the front-rear direction, a front frame 22 connecting the front ends of the pair of side frames 21, and a plurality of cross frames 23 that connect in the left-right direction between the pair of side frames 21.

This embodiment has five cross frames 23 between the pair of side frames 21. Wheels H are arranged on both the left and right sides of the cross frame 23 arranged at the front and the cross frame 23 arranged at the rear out of the five cross frames 23, and the three cross frames 23 arranged in the middle are said to be support frames 25 that support the body panel 30 from below together with the pair of side frames 21.

Figure 3:
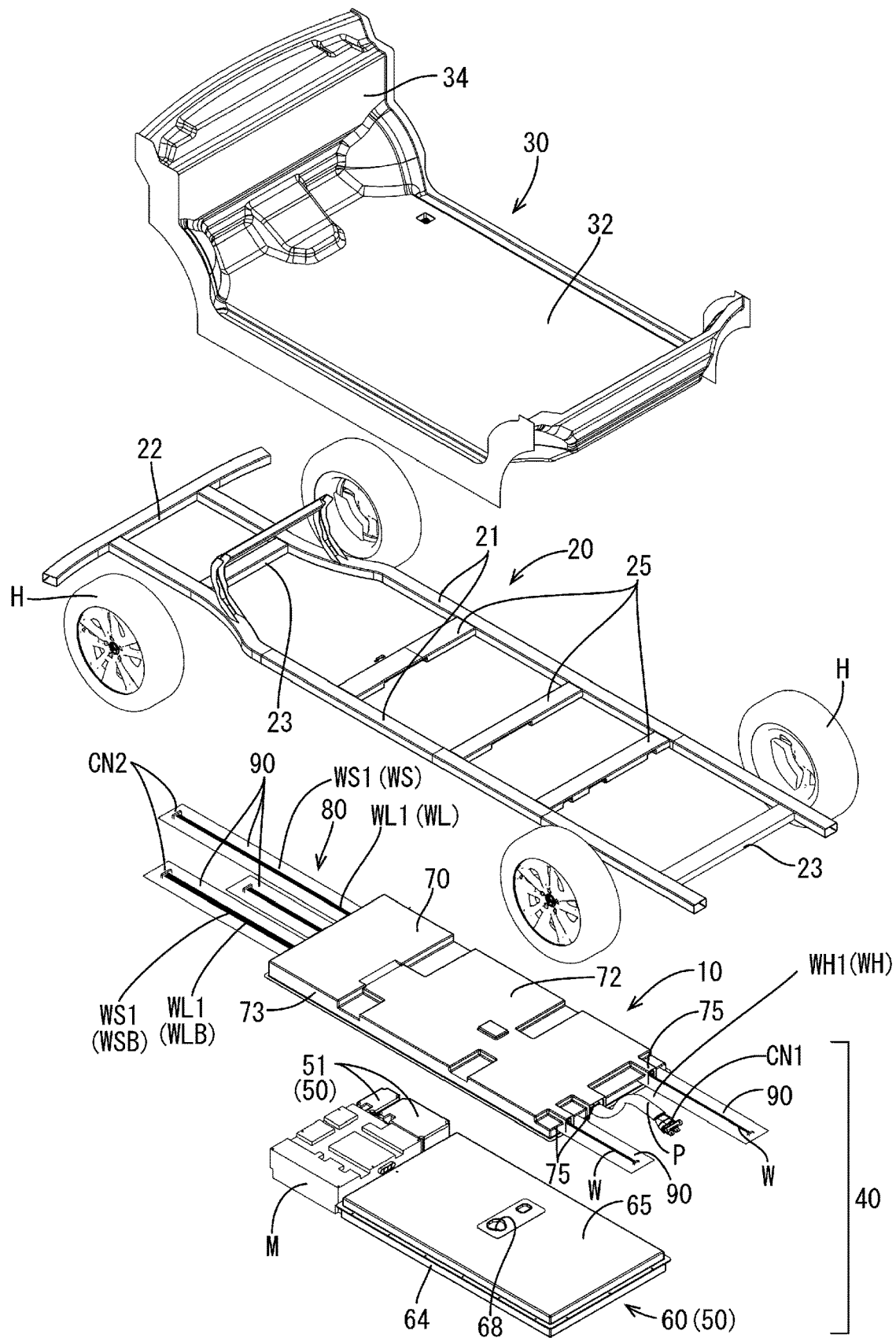
FIG. 3 is an exploded perspective view showing a state before attaching the power storage device to the vehicle frame.

A body panel 30 makes up a passenger compartment RM, as shown in FIG. 3, and comprises a floor panel 32 arranged above the vehicle frame 20 and a front panel 34 provided at a front edge of the floor panel 32.

The floor panel 32 is formed in a flat shape, and the front panel 34 stands such that it is connected to the front edge of the floor panel 32.

As shown in FIGS. 1 to 4, a power storage device 40 is attached to a lower part of the vehicle frame 20 from below. When the power storage device 40 is attached to the vehicle frame 20, the power storage device 40 is positioned in an area extending from a position slightly in front of the support frame 25 arranged at the front side, out of the three support frames 25, to the support frame 25 arranged at the rear side.

As shown in FIGS. 2 and 3, the power storage device 40 is formed in the shape of a flat box having a substantially rectangular shape in a plan view that is long in the front-rear direction, and the power storage device 40 comprises a plurality of power storage modules 50, a multi-box M, and a power storage cover member (power storage cover) (an example of a "base plate") 70 that collectively covers the power storage modules 50 and the multi-box M.

The plurality of power storage modules 50 includes a low-voltage power storage module 51 having a relatively low voltage among the plurality of power storage modules 50, and a high-voltage power storage module 60 having a relatively high voltage. As shown in FIG. 3, the power storage device 40 of this embodiment includes two types of low-voltage power storage modules 51 and one type of high-voltage power storage module 60.

Figure 4:
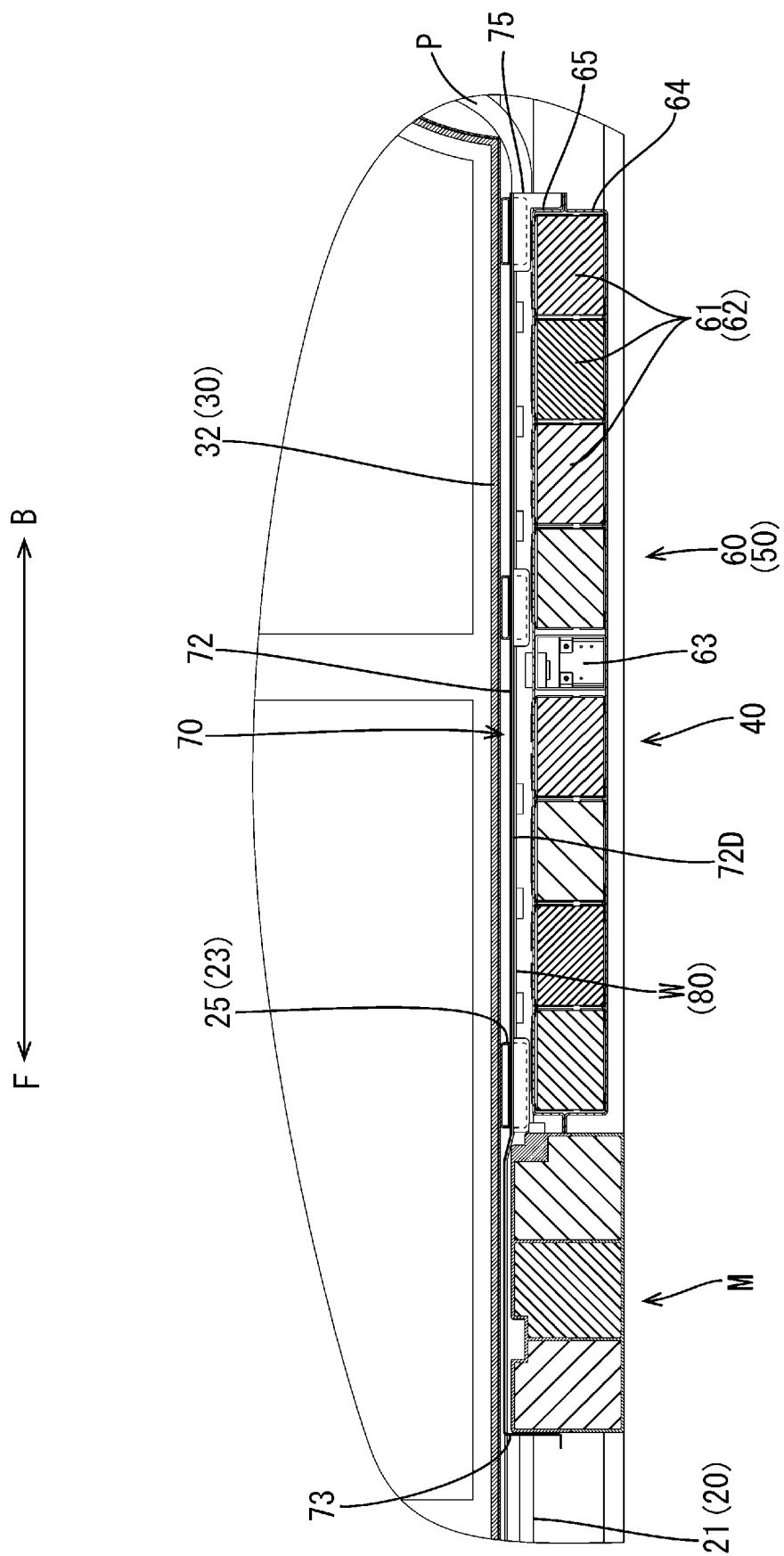
FIG. 4 is an enlarged sectional view of a main part of FIG. 1.

As shown in FIG. 3, the high-voltage power storage module 60 is about two-thirds the size of the power storage device 40, when viewed from above, and is formed in the shape of a flat box with a substantially rectangular shape in a plan view. As shown in FIG. 4, the high-voltage power storage module 60 comprises a power storage element group 62 composed of a plurality of power storage elements 61, a junction box 63 connected to the power storage element group 62, a lower case 64 that houses the power storage element group 62 and the junction box 63, and an upper case 65 fixed to the lower case 64 so as to collectively cover the power storage element group 62 and the junction box 63 from above.

The lower case 64 is made of metal and opens upward in a substantially rectangular shape, and as shown in FIG. 4, the power storage element group 62 is made of a plurality of power storage elements 61 lined up in the lower case 64. Undepicted connection modules for connecting adjacent power storage elements 61 to each other are assembled at an upper part of the power storage element group 62.

The junction box 63 has a substantially rectangular box shape, and an undepicted protective member such as a relay for interrupting electric current is housed in the junction box 63. An undepicted electric wire is pulled out from the junction box 63, and the terminus of the electric wire is provided with an undepicted high-voltage connector that is passed through a through hole 68 provided in a below-described upper case 65.

The upper case 65 is made of metal and, as shown in FIGS. 3 and 4, is formed in the shape of a box having a substantially rectangular shape in a plan view, is slightly larger than the lower case 64 and opens downward. The through hole 68 that penetrates in the vertical direction is provided in the center of the upper case 65, and the high-voltage connector of the electric wire extending from the junction box 63 is fixed after passing through the through hole 68. The upper case 65 is fixed to the lower case 64 by an undepicted fixing mechanism. An undepicted sealing member seals between the upper case 65 and the lower case 64.

As shown in FIG. 3, each low-voltage power storage module 51 is formed by housing in a small case an undepicted power storage element group composed of a plurality of power storage elements.

Although each low-voltage power storage module 51 is formed to have a slightly larger height than the high-voltage power storage module 60, it is smaller than the high-voltage power storage module 60 in the front-rear and left-right directions. In addition, the low-voltage power storage modules 51 are arranged side by side in the front-rear direction so as to be adjacent to a short side portion on the front side extending in the left-right direction of the high-voltage power storage module 60. Of the two types of low-voltage power storage modules 51, one is a 12 V low-voltage power storage module 51, and the other is a 48 V low-voltage power storage module 51.

As shown in FIG. 3, two multi-boxes M are arranged side by side so as to be adjacent to the low-voltage power storage module 51 in the left-right direction and adjacent to the short side of the high-voltage power storage module 60 in the front-rear direction. The multi-boxes M are configured to house, for example, a high-voltage junction box, a plurality of DC-DC converters, a charger, and the like. Similar to the low-voltage power storage modules 51, the multi-boxes M have a slightly larger height than the high-voltage storage module 60, and as shown in FIG. 4, the multi-boxes M have a shape that protrudes upward more than the high-voltage storage module 60.

The power storage cover member 70 is made of a conductive metal. As shown in FIGS. 3 and 4, the power storage cover member 70 is attached to the plurality of power storage modules 50 and the multi-box M from above, and when the power storage device 40 is attached to the vehicle frame 20 from below, the storage cover member 70 is arranged between the pair of side frames 21. In other words, the storage cover member 70 is arranged inside the pair of side frames 21 arranged at both sides of the vehicle frame 20.

Further, as shown in FIG. 3, the power storage cover member 70 has a top plate 72 having a substantially rectangular shape in a plan view, and the top plate 72 is of a size large enough to cover all at once the plurality of power storage modules 50 and the multi-box M from above. As shown in FIGS. 3 and 4, four side plates 73 extending downward are provided on the side edges of the top plate 72, and by having adjacent side plates 73 connected to each other in the circumferential direction, the storage cover member 70 is formed in the shape of a flat box that opens downward.

Figure 1:
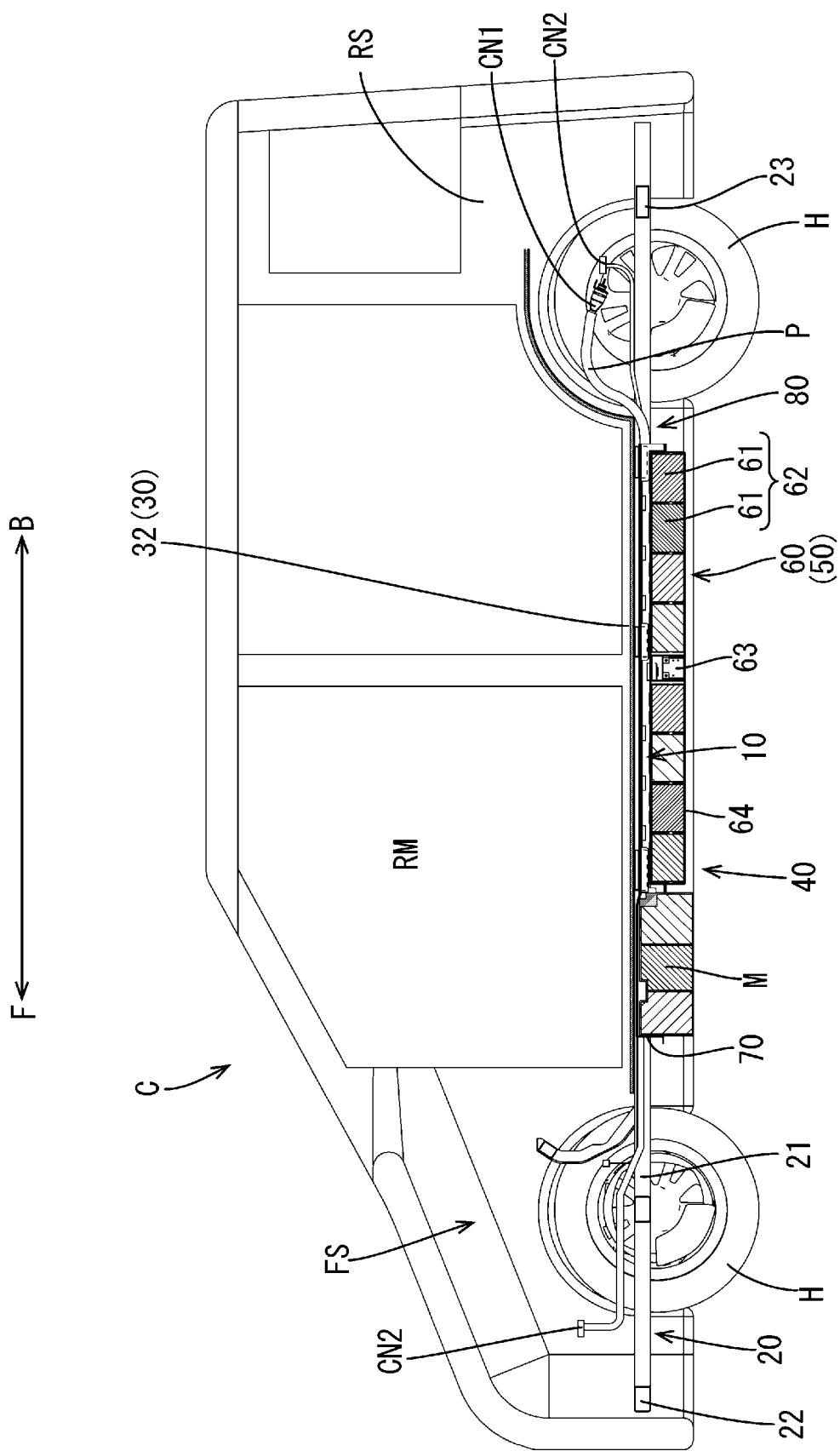
FIG. 1 is a vertical cross-sectional view of a vehicle in which a wire harness routing member according to an embodiment is assembled.

As shown in FIG. 1 and FIG. 4, the height of each side plate 73 in the vertical direction is about half of the height of the low-voltage power storage modules 51 and the multi-boxes M. When the power storage cover member 70 is attached to the power storage module 50 and the multi-boxes M, the power storage cover member 70 also has the function of electromagnetically shielding the upper part of the low-voltage power storage modules 51, the high-voltage power storage module 60 and the multi-boxes M by covering the top half of the low-voltage power storage modules 51, the high-voltage power storage module 60 and the multi-boxes M.

As shown in FIGS. 3 through 8, a wire harness 80 is fixed to the top plate 72 of the power storage cover member 70, and the wire harness routing member 10 comprises the power storage cover member 70 and the wire harness 80. In FIG. 3, the top plate 72 is omitted from the figure to facilitate understanding of the wire harness 80.

The wire harness 80 is composed of a plurality of electric wires W fixed to the top plate 72 and a holding member 90 to which the plurality of electric wires W extending from the top plate 72 are fixed.

Figure 5:
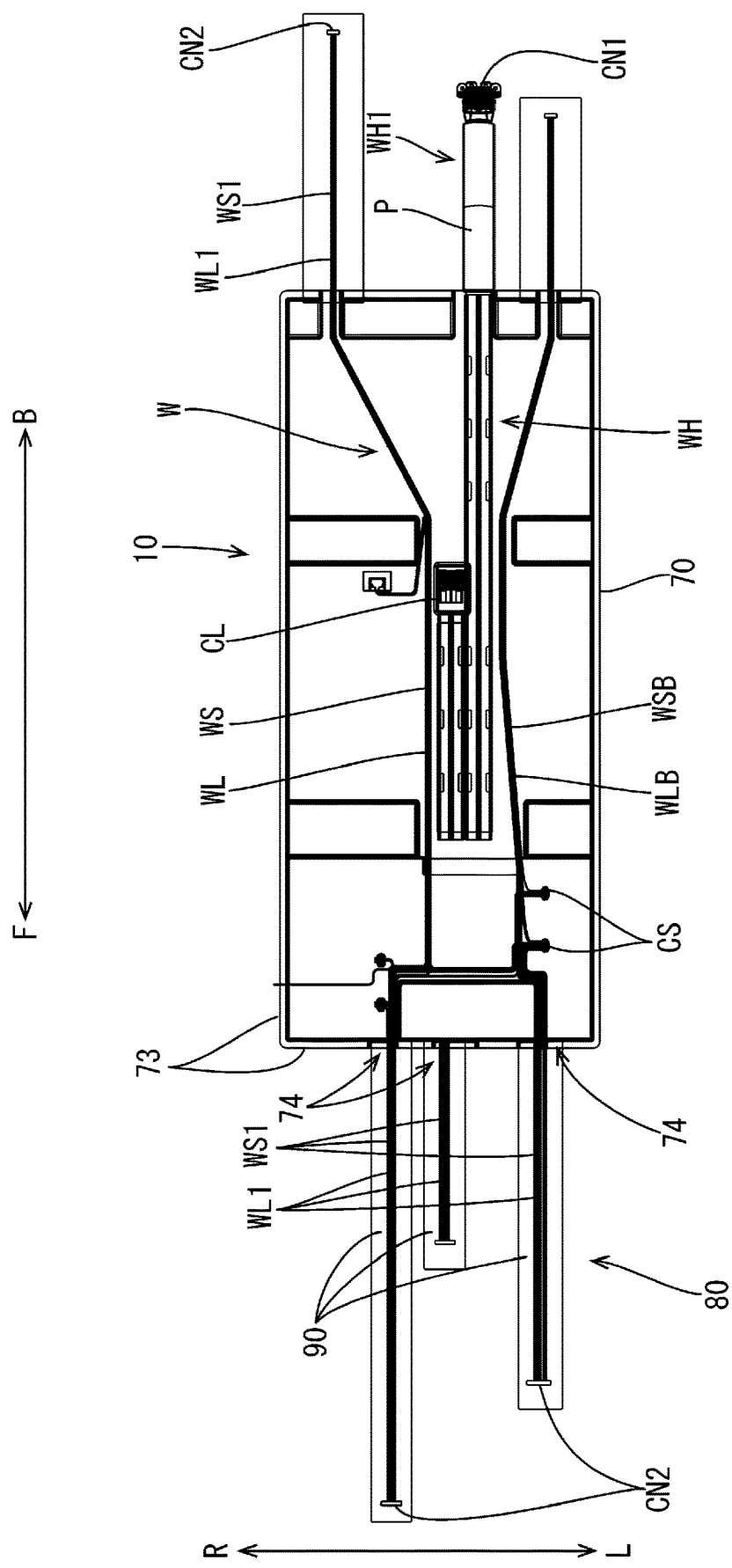
FIG. 5 is a plan view of a wire harness routing member.

As shown in FIG. 4 and FIG. 5, each of the plurality of electric wires W is a continuous electric wire formed continuously without being cut in the middle and is fixed flatly to a lower surface 72D that is the lower surface of the top plate 72 so as to run along the top plate 72.

Here, as a fixing method for flatly aligning and fixing the plurality of electric wires W to the top plate 72, the coatings of the electric wires W may be fused to the lower surface 72D of the top plate 72, or an undepicted fusion sheet in which a plurality of electric wires W is flatly aligned and fused or sewn may be fused to the top plate 72. Further, the plurality of electric wires W may be fixed by a commonly known fixing method such as being fixed by an adhesive applied to the lower surface 72D of the top plate 72 or being fixed by double-sided tape or the like to the lower surface 72D of the top plate 72.

In addition, the plurality of electric wires W has flexibility, although rigidity differs depending on the wire type, and includes a plurality of high-voltage power supply wires WH, a plurality of low-voltage power supply wires WL, a plurality of signal wires WS, a plurality of low-voltage auxiliary wires (an example of "auxiliary electric wires") WLB, and a plurality of auxiliary signal wires (an example of "auxiliary electric wires") WSB.

The high-voltage power supply wires WH are the electric wires W that transmit relatively high-voltage current among the plurality of electric wires W, and as shown in FIG. 5, are fixed roughly in the center of the top plate 72 in the left-right direction. The high-voltage power supply wires WH are wires that, for example, connect the high-voltage power storage module 60 with undepicted high-voltage devices such as inverters or the like, the multi-boxes M and the rear space RS of the vehicle C. Of the plurality of high-voltage power supply wires WH, a high-voltage power supply wire WH, one end of which is connected to a high-voltage connector of the high-voltage power storage module 60 via a large connector CL on the lower surface 72D of the top plate 72 of the power storage cover member 70 and the other end of which extends from the edge of the power storage cover member 70 to the rear space RS, is called a long high-voltage wire (one example of a "first electric wire") WH1.

The low-voltage power supply wires WL are the electric wires W that transmit relatively low-voltage current among the plurality of electric wires W, and as shown in FIG. 5, are fixed to the top plate 72 so as to be parallel to the high-voltage power supply wires WH and to the side of the high-voltage power supply wires WH. In this embodiment, a plurality of low-voltage power supply wires WL is arranged at the right side of the high-voltage power supply wires WH, and the low-voltage power supply wires WL are electric wires W that, for example, connect the low-voltage power storage modules 51 and undepicted low-voltage devices such as audio or sensors installed in the multi-boxes M, or the front space FS or rear space RS of the vehicle C.

Similar to the low-voltage power supply wires WL, the low-voltage auxiliary wires WLB are electric wires W that transmit a relatively low-voltage current among the plurality of electric wires W, and although connected to the connected low-voltage power storage modules 51, the multi-boxes M, low-voltage devices and the like to which the low-voltage power supply wires WL are connected, are arranged along a different path from the low-voltage power supply wires WL.

In this embodiment, the plurality of low-voltage auxiliary wires WLB is fixed to the top plate 72 so as to be parallel to the high-voltage power supply wires WH, on the left side of the high-voltage power supply wires WH.

In other words, the low-voltage auxiliary wires WLB are electric wires W arranged as a redundancy of the low-voltage power supply wires WL, and even if the low-voltage power supply wires WL are disconnected, the low-voltage auxiliary wires WLB function as a backup to the low-voltage power supply wires WL.

Of the plurality of low-voltage power supply wires WL and the plurality of low-voltage auxiliary wires WLB, the low-voltage power supply wires WL and low-voltage auxiliary wires WLB that have (i) one end connected to the low-voltage power storage module 51 via a small connector CS on the lower surface 72D of the top plate 72 of the power storage cover member 70 and (ii) another end extended from the top plate 72 of the power storage cover member 70 and extended as far as the front space FS or rear space RS are called long low-voltage wires WL1 (one example of "first electric wires").

The signal wires WS are electric wires W that transmit signals between undepicted electrical devices such as an ECU or sensors mounted on the vehicle C or the like, and as shown in FIG. 5, are fixed to the top plate 72 so as to be parallel to the high-voltage power supply wires WH and to the side of the high-voltage power supply wires WH, similar to the low-voltage power supply wires WL and the low-voltage auxiliary wires WLB.

In this embodiment, a plurality of signal wires WS is arranged at the right side of the high-voltage power supply wires WH and is, for example, electric wires W that (i) connect undepicted electrical devices installed in the front space FS or rear space RS and an undepicted control unit provided in the power storage module 50, (ii) connect electrical devices installed in the front space FS or rear space RS and the multi-boxes M, or (iii) connect electrical devices installed in the front space FS or rear space RS to each other.

Auxiliary signal wires WSB are electrical wires W that transmit signals between electrical devices such as the ECU or sensors mounted on the vehicle C, similar to the signal wires WS, and even though connected to the control unit of the low-voltage power storage modules 51, the multi-boxes M and the low-voltage devices and the like to which the signal wires WS are connected, are arranged along a different path from the signal wires WS.

In this embodiment, the plurality of auxiliary signal wires WSB is fixed to the top plate 72 so as to be parallel to the high-voltage power supply wires WH on the left side of the high-voltage power supply wires WH. In other words, the auxiliary signal wires WSB are electric wires that are arranged as a redundancy of the signal wires WS, and even if the signal wires WS are broken, the auxiliary signal wires WSB function as a backup to the signal wires WS.

Of the plurality of signal wires WS and the plurality of auxiliary signal wires WSB, the signal wires WS and the auxiliary signal wires WSB of which both ends extend from the top plate 72 of the power storage member 70 and extend as far as the front space FS or the rear space RS are called long signal wires (an example of "second wires") WS1, as shown in FIG. 3 and FIG. 5.

Therefore, any of the electric wires W that are long high-voltage wires WH1, long low-voltage wires WL1 or long signal wires WS1 can be considered continuous electric wires W that are not broken in the middle, even though extending from the edges of both front and rear sides of the top plate 72 of the power storage cover member 70.

As shown in FIG. 5, the plurality of long high-voltage wires WH1 extend rearward from a position somewhat to the left of approximately the center in the left-right direction at the rear edge of the top plate 72, and in the plurality of long high-voltage wires WH1, the portions extending from the top plate 72 are collectively covered by a resin protector P such as a corrugated tube or the like. A high-voltage wire connector CN1 is assembled on the ends of the plurality of long high-voltage wires WH1, and this high-voltage wire connector CN1 is connected to an undepicted high-voltage device such as an inverter or the like.

As shown in FIG. 5, the plurality of long low-voltage wires WL1 and the plurality of long signal wires WS1 are pulled out to the front from front-side extraction parts 74 in a total of three locations on the front edge of the top plate 72, namely a position in approximately the center in the left-right direction, a position somewhat to the right from the approximate center in the left-right direction and a position somewhat to the left from the right side edge, and at the rear edge of the top plate 72, and extend rearward from rear-side extraction parts 75 in two locations on both edges in the left-right direction.

As shown in FIG. 2, FIG. 3 and FIG. 5, at the ends of the plurality of long low-voltage wires WL1 and the plurality of long signal wires WS1 extending in the front and rear directions from the front-side extraction parts 74 and the rear-side extraction parts 75, there are attached equipment-side connectors CN2 to which the long low-voltage wires WL1 and the long signal wires WS1 are introduced, and the plurality of long low-voltage wires WL1 and the plurality of long signal wires WS1 extending in the front and rear directions from the front-side extraction parts 74 and the rear-side extraction parts 75 are fixed to holding members 90.

The holding members 90 are made of synthetic resin, and as shown in FIG. 2, FIG. 3, and FIG. 5, are formed in a strip shape extending straight in the front-rear direction and have a rigidity capable of maintaining the strip shape. Furthermore, the long low-voltage wires WL1 and the long signal wires WS1 are fixed to both top and bottom surfaces of the holding members 90. In other words, the long low-voltage wires WL1 and the long signal wires WS1 have flexibility but by being fixed to the holding members 90 can be arranged along a three-dimensional routing path in the vehicle C, and the shape can also be maintained in a three-dimensional form.

A method of fixing the long low-voltage wires WL1 and the long signal wires WS1 to the holding members 90 may be fusing covers of the long low-voltage wires WL1 and the long signal wires WS1 to the surfaces of the holding members 90, or may be fixing through an adhesive coated on the surfaces of the holding members 90. In addition, the long low-voltage wires WL1 and the long signal wires WS1 may be fixed to the holding members 90 through a commonly known fixing method such as double-sided tape or the like.

Figure 6:
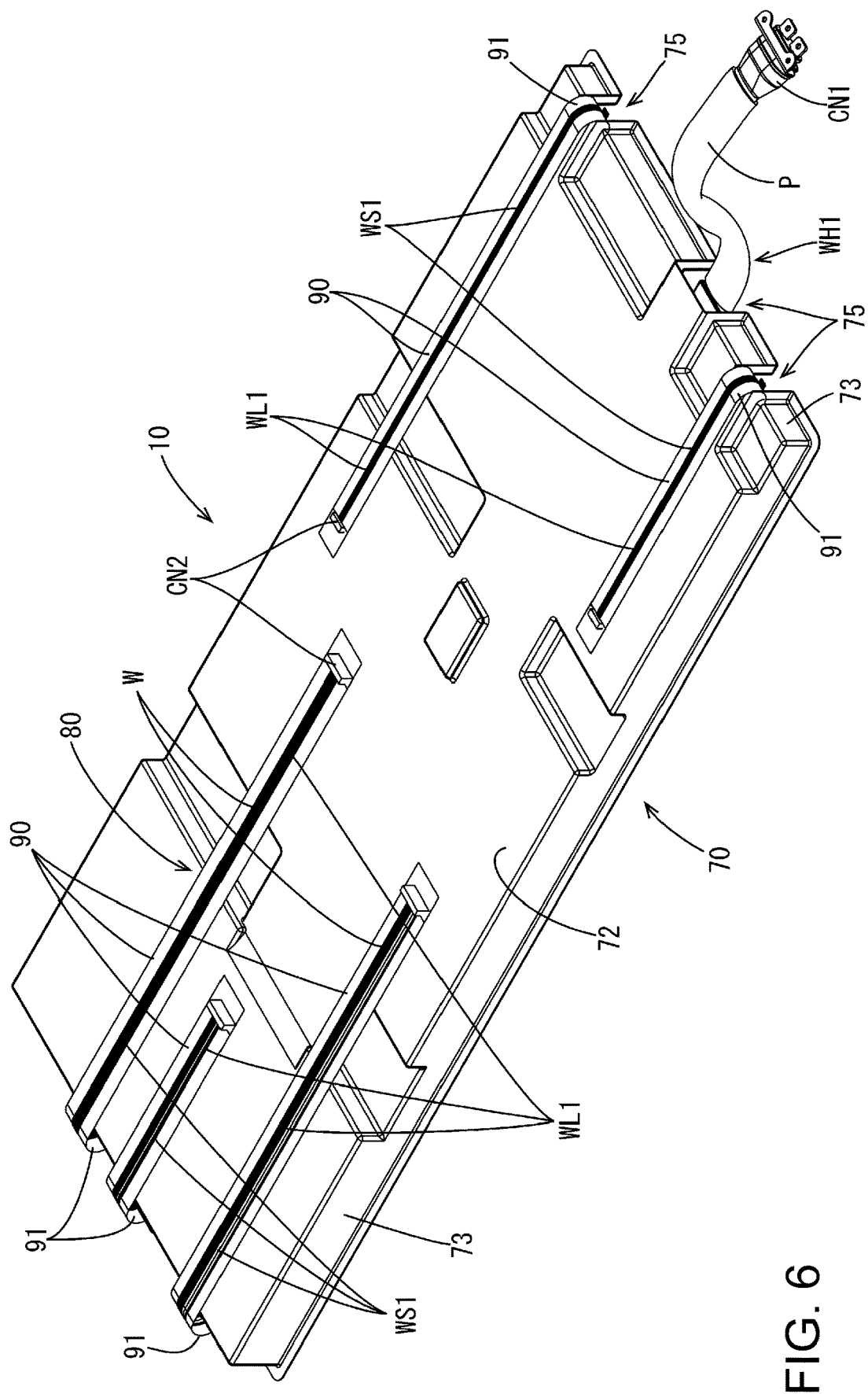
FIG. 6 is a perspective view of a wire harness routing member showing a folded state of the holding member.
Figure 7:
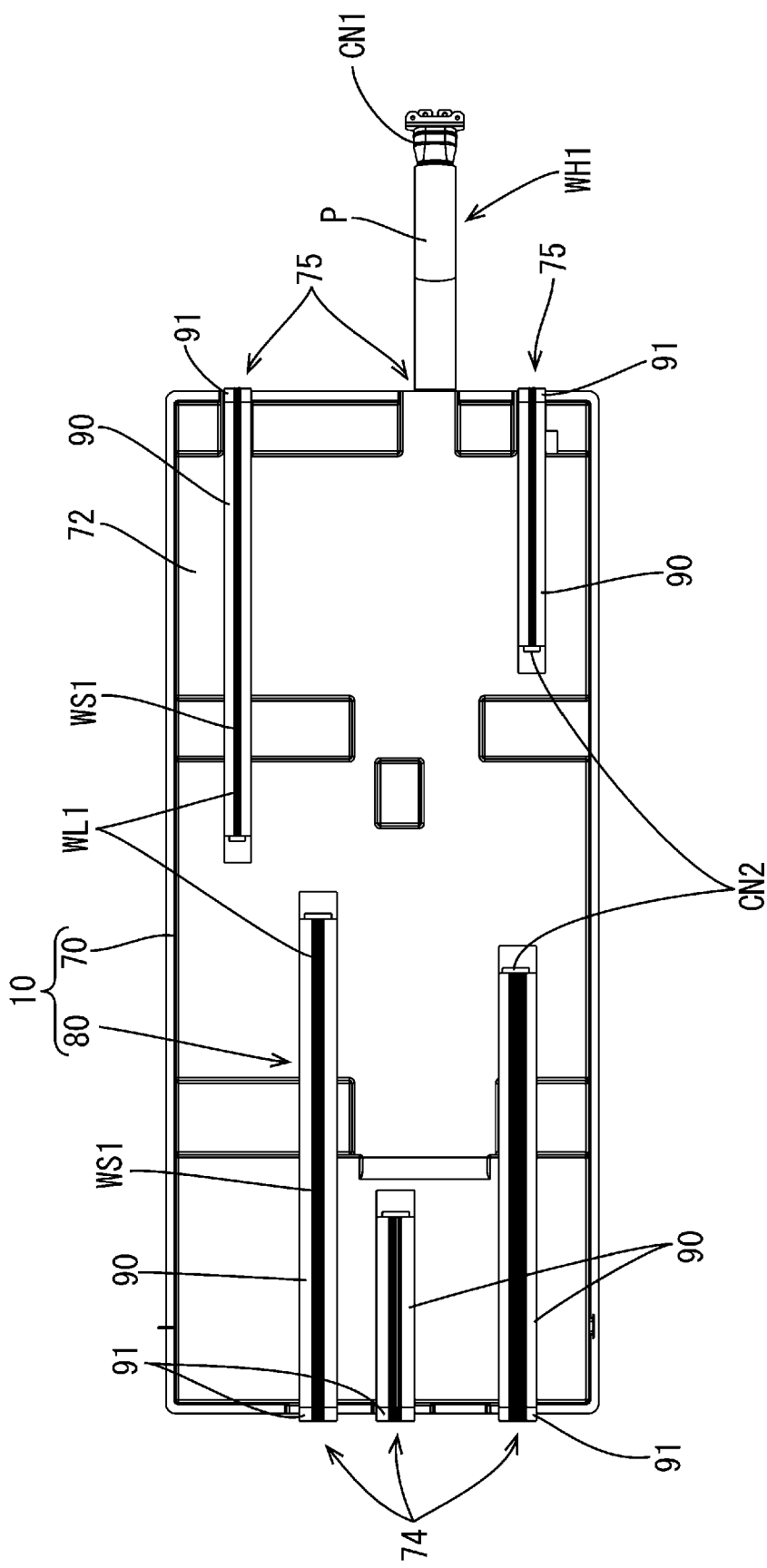
FIG. 7 is a plan view of a wire harness routing member showing a folded state of the holding member.
Figure 8:
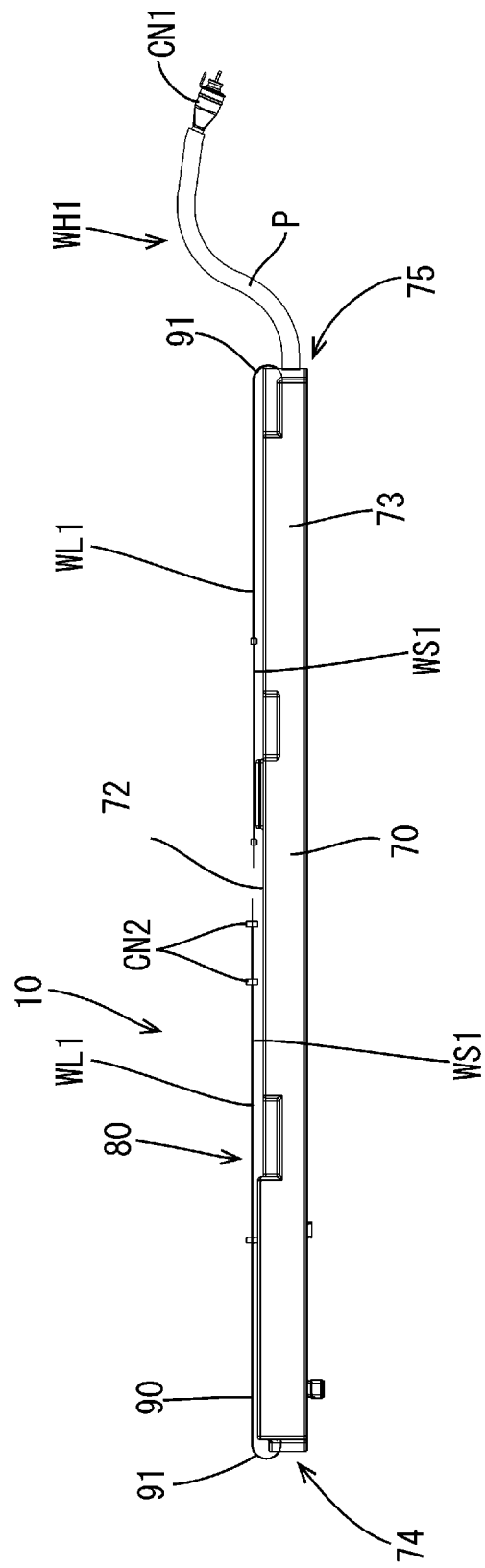
FIG. 8 is a side view of the wire harness routing member showing a folded state of the holding member.

In addition, the holding members 90 are formed with bent portions 91 having flexibility such that the end portions of the front-side extraction part 74 and the rear-side extraction part 75 side can be bent in the vertical direction, and by bending the bent portions 91 upward, the holding members 90 to which the long low-voltage wires WL1 and the long signal wires WS1 are fixed can be folded and arranged on the top side of the power storage cover member 70, as shown in FIG. 6 through FIG. 8.

This embodiment has the above-described configuration, and next, an application and efficacy of a power storage device having the power storage cover member 70 will be described.

In the past, a wire harness laid out in a vehicle is arranged throughout the entire vehicle from the front space in which the engine compartment is arranged to the rear space of the vehicle by connecting a plurality of wire harnesses at a plurality of places with connectors or the like. However, when arranging the wire harness in this way, in order to connect the wire harness routed to the passenger compartment and the wire harness routed to the front space or the rear space, the connection must be made by providing through holes between the passenger compartment and the front space or rear space and using connectors or the like. In addition, when connecting wire harnesses with connectors, the number of components and man-hours for connection work increase, and the contact points may wear due to the influence of vehicle vibrations and the like, so that connection reliability between devices is reduced.

Therefore, the present inventors have conducted diligent studies in order to solve the above problems, and as a result discovered the configuration of this embodiment. That is, as shown in FIGS. 1 to 5, this embodiment is a wire harness routing member 10 for routing a plurality of electric wires W in the vehicle C, and is a wire harness routing member 10 comprising (i) a power storage cover member (base plate) 70 arranged below the floor panel 32 of the passenger compartment RM and (ii) a wire harness 80 having a plurality of electric wires W fixed to the power storage cover member 70, and in which at least one electric wire W of the plurality of electric wires W has one end arranged on the surface of the power storage cover member 70 and another end extending from an edge of the power storage cover member 70 and is the continuous long high-voltage wire WH1 and the long low-voltage wire WL1 (electric wire) arranged in the front space FS or the rear space RS of the vehicle C, and at least one electric wire W out of the plurality of electric wires W is the continuous long signal wire WS1, both ends of which extend from the edge of the power storage cover member 70 and are arranged in the front space FS or the rear space RS.

With this kind of wire harness routing member 10, the long high-voltage wires WH1 and the long low-voltage wires WL1 are continuously configured from the position of the power storage cover member 70 to the position of the front space FS or the rear space RS, and the long signal wires WS1 are continuously configured from the position of the front space FS to the position of the rear space RS, and in addition, from the front space FS to the front space FS via the power storage cover member 70. That is, for example unlike a wire harness connected by connectors at a plurality of locations, there is no risk of contact points wearing, and it is possible to prevent a decrease in connection reliability between devices.

Further, with this embodiment, since the electric wires W are fixed to the storage cover member 70 arranged below the floor panel 32, there is no need to provide through holes in the floor panel 32 or to undertake the work of attaching connectors to the through holes or the work of connecting the connectors, so it is possible to prevent an increase in work man-hours and the number of components. As a result, it is possible to simplify the routing work of the plurality of electric wires W in the vehicle.

Further, the power storage cover member (base plate) 70 is a power storage cover member 70 of the power storage device 40 assembled below the floor panel 32 of the vehicle C.

That is, it is possible to route the wire harness 80 in the vehicle C by fixing a plurality of electric wires W to the power storage cover member 70 of the power storage device 40 assembled below the floor panel 32 of the vehicle C. As a result, the number of components and the arrangement space of the wire harness 80 can be reduced as compared with cases where the base plate is provided separately from the power storage device 40.

Further, as shown in FIGS. 4 and 5, the plurality of electric wires W of this embodiment are fixed side-by-side flat along the surface of the power storage cover member 70. In this embodiment, since a plurality of electric wires W is fixed flat to the surface of the power storage cover member 70, for example, compared with cases where a bundle of electric wires in which a plurality of electric wires is bundled is fixed to the power storage cover member, the area where the wire harness 80 is arranged can be reduced in the vertical direction. As a result, the arrangement space of the wire harness routing member 10 can be further reduced.

Further, the power storage device 40 is configured to include a plurality of power storage modules 50 and a power storage cover member 70 that collectively covers the plurality of power storage modules 50, and the plurality of electric wires W is fixed to the lower surface 72D, which is the surface of the power storage cover member 70 on the power storage module 50 side, as shown in FIG. 4.

That is, with this embodiment, the wire harness 80 composed of a plurality of electric wires W is routed within the power storage device 40, and therefore, compared for example to cases in which a wire harness composed of a plurality of electric wires is routed on the outer surface of a power storage cover member, it is possible to prevent other members from coming into contact with the plurality of electric wires W. Through this, it is possible to prevent the wire harness 80 from being damaged due to contact with other members.

Further, the power storage cover member 70 is made of a conductive metal. That is, since the plurality of electric wires W is covered by the power storage cover member 70 made of conductive metal, the plurality of electric wires W can be electromagnetically shielded even without separately covering the plurality of electric wires W with a shield material such as a braided wire. As a result, it is possible to suppress an increase in the number of components and man-hours for attaching the shield member, and it is possible to reduce the arrangement space of the wire harness routing member 10.

Further, with this embodiment, the power storage device 40 is assembled to a lower part of the vehicle frame 20 of the vehicle C, as shown in FIG. 2, and when assembled on the vehicle frame 20, the power storage device 40 is placed inward of the side frames 21 provided on the sides of the vehicle frame 20.

For example, in the case of electric wires that transmit electric power or signals important for operating a vehicle, if the electric wires are broken, a problem such as being unable to operate the vehicle occurs.

However, with this embodiment, the wire harness 80 having the plurality of electric wires W is fixed to the power storage cover member 70 of the power storage device 40 arranged inward of the side frames 21 provided on the sides of the vehicle frame 20, and hence it is possible to prevent the electric wires W from breaking even if another vehicle or the like collides with the vehicle from the side.

Further, as shown in FIG. 5, the wire harness 80 of this embodiment has at least one low-voltage auxiliary wire WLB arranged along a path different from that of the low-voltage power supply wires WL so as to become a redundancy of the low-voltage power supply wires WL, and at least one auxiliary signal wire WSB which is arranged along a path different from the signal wires WS so as to become a redundancy of the signal wires WS.

When the low-voltage power supply wires WL or the signal wires WS are electric wires that transmit electric power or signals that are important for operating the vehicle C, when the low-voltage power supply wires WL or the signal wires WS are broken, a problem such as being unable to operate the vehicle C occurs.

However, with this embodiment, the low-voltage auxiliary wires WLB that are a redundancy of the low-voltage power supply wires WL are arranged along a different path from the low-voltage power supply wires WL, and the auxiliary signal wires WSB that are a redundancy of the signal wires WS are arranged along a different path from the signal wires WS, so even if the low-voltage power supply wires WL or the signal wires WS are broken, the electric power and signals that are important for operating the vehicle C can be secured by the low-voltage auxiliary wires WLB and the auxiliary signal wires WSB.

Further, in this embodiment, the long low-voltage wires WL1 and the long signal wires WS1 (electric wires) extending from the power storage cover member (base plate) 70 are fixed to the holding members 90 extending along the routing path, as shown in FIGS. 5 to 8.

With this embodiment, before arranging the wire harness routing member 10 on the vehicle C, the long low-voltage wires WL1 and the long signal wires WS1 can be arranged in advance by the holding members 90 so as to follow the routing path, and hence it is possible to improve the workability of routing the long low-voltage wires WL1 and the long signal wires WS1 in the vehicle C. In addition, since the long low-voltage wires WL1 and the long signal wires WS1 are reinforced by the holding members 90, pulling and breaking of the long low-voltage wires WL1 and the long signal wires WS1 can be suppressed.

Further, the holding members 90 of this embodiment have rigidity capable of holding a shape. That is, it is possible to configure the shapes of the long low-voltage wires WL1 and the long signal wires WS1 according to a three-dimensional wiring path of the vehicle C. In other words, by arranging the holding members 90 with respect to the vehicle C, routing of the long low-voltage wires WL1 and the long signal wires WS1 can be almost completed. Through this, it is possible to further improve the routing workability of the long low-voltage wires WL1 and the long signal wires WS1.

Further, in the holding members 90 of this embodiment, as shown in FIGS. 6 to 8, the bent portions (ends) 91 on the power storage cover member (base plate) 70 side can be bent, and the long low-voltage wires WL1 and the long signal wires WS1 (electric wires) can be folded by bending the bent portions 91 of the holding members 90 before being routed in the vehicle C.

Generally, the wire harness routing member 10 that routes the wire harness 80 from the front space FS to the rear space RS of the vehicle C becomes very large in the front-rear direction. However, in order to convey the wire harness routing member 10, it is desirable that the wire harness be small and not bulky.

Here, the wire harness routing member 10 of this embodiment has long low-voltage wires WL1 and long signal wires WS1 extending from the power storage cover member 70, and the long low-voltage wires WL1 and the long signal wires WS1 can be folded together with the holding members 90 by bending the bent portions 91 on the power storage cover member 70 side in the holding members 90.

That is, in the state before the wire harness routing member 10 is attached to the vehicle C, the size of the wire harness routing member 10 in the front-rear and left-right directions can be reduced to almost the same size as the power storage cover member 70. Through this, the work of conveying the wire harness routing member 10 can be facilitated for example in comparison with cases where the portion extending from the power storage cover member cannot be folded.

OTHER EMBODIMENTS

The technology disclosed herein is not limited to the embodiment described above and in the drawings, and includes, for example, various aspects such as the following.

(1) In the above embodiment, the wire harness 80 is fixed to the power storage cover member 70 of the power storage device 40. However, this disclosure is not limited to this, and a plate-shaped plate member different from the power storage cover member may be provided separately, and the wire harness may be fixed to the plate member.

(2) In the above embodiment, a plurality of long low-voltage wires WL1 and a plurality of long signal wires WS1 are configured to extend to the front and rear from the top plate 72 of the power storage cover member 70. However, this disclosure is not limited to this, and the long low-voltage wires and the long signal wires extending from the power storage cover member may be one electric wire or may be configured as an electric wire bundle in which a plurality of electric wires is bundled.

(3) In the above embodiment, the configuration is such that the wire harness 80 is fixed to the lower surface 72D of the top plate 72 on the power storage cover member 70. However, this disclosure is not limited to this, and the wire harness may be such that a routing groove is provided in the outer surface which is the upper surface of the top plate of the power storage cover member, and the wire harness is routed in the routing groove.

(4) In the above embodiment, the power storage device 40 is arranged inward of the pair of side frames 21 of the vehicle frame 20. However, this disclosure is not limited to this, and if the power storage device is firmly protected by being covered with a highly rigid power storage frame or the like, the power storage device need not be arranged inward of the pair of side frames.

(5) In the above embodiment, the low-voltage auxiliary wires WLB are arranged on the lower surface 72D of the top plate 72 of the power storage cover member 70 as a redundancy of the low-voltage power wires WL1, and auxiliary signal wires WSB are arranged as a redundancy of the signal wires WS. However, this disclosure is not limited to this, and the low-voltage auxiliary wires and the auxiliary signal wires may be arranged on the upper surface of the top plate of the power storage cover member.

(6) In the above embodiment, the holding members 90 are formed in a strip shape extending linearly in the front-rear direction. However, this disclosure is not limited to this, and the holding members may be bent according to the routing path of the long low-voltage wires or the long signal wires, or may be formed into a large plate shape.

(7) In the above embodiment, the wire harness 80 fixed to the top plate 72 of the power storage cover member 70 has a configuration that includes a plurality of high-voltage power supply wires WH, a plurality of low-voltage power supply wires WL, a plurality of signal wires WS, a plurality of low-voltage auxiliary wires WLB, and a plurality of auxiliary signal wires WSB, each configured as continuous electric wires. However, this disclosure is not limited to this, and the wire harness fixed to the top plate may be composed of only one out of the high-voltage power supply wires, the low-voltage power supply wires, and the signal wires, or a combination of any of these electric wires.

(8) In the above embodiment, the configuration is such that all of the electric wires of the wire harness 80 fixed to the top plate 72 of the power storage cover member 70 are continuous electric wires. However, this disclosure is not limited to this, and the wire harness fixed to the top plate may be configured with electric wires of which at least one is continuous and the other electric wires are not continuous.

The invention claimed is:

1. A wire harness routing member that routes a plurality of electric wires in a vehicle, the wire harness routing member comprising:
   a base plate that is arranged below a floor panel of a passenger compartment; and
   a wire harness having the plurality of electric wires fixed to the base plate; wherein:
      at least one electric wire out of the plurality of electric wires is a continuous electric wire with a first end extending from a surface of the base plate or an edge of the base plate and being arranged in a front space of the vehicle or a rear space of the vehicle, and a second end extending from the edge of the base plate and being arranged in the front space of the vehicle or the rear space of the vehicle;
      the continuous electric wire extending from the base plate is fixed to a holding member that extends along a wire routing path;
      the holding member has a bendable end on a base plate side; and
      the continuous electric wire can be folded by bending an edge of the holding member in a state prior to being arranged in the vehicle.

2. The wire harness routing member according to claim 1, wherein the continuous electric wire is a continuous first wire, the first end is arranged on the surface of the base plate and the second end extends from the edge of the base plate and is arranged in the front space of the vehicle or the rear space of the vehicle.

3. The wire harness routing member according to claim 1, wherein the continuous electric wire is a continuous second wire, the first and second ends extend from the edge of the base plate and are arranged in the front space or the rear space.

4. The wire harness routing member according to claim 1, wherein:
   the plurality of electric wires includes a plurality of continuous electric wires; and
   the plurality of continuous electric wires is fixed flatly side-by-side so as to run along the surface of the base plate.

5. The wire harness routing member according to claim 1, wherein the base plate is a power storage cover of a power storage device assembled below the floor panel.

6. The wire harness routing member according to claim 5 wherein:
   the power storage device is provided with a plurality of power storage modules and the power storage cover that collectively covers the plurality of power storage modules;
   the plurality of electric wires includes a plurality of the continuous electric wires; and the plurality of continuous electric wires is fixed to a surface of the power storage cover on a power storage module side.

7. The wire harness routing member according to claim 6, wherein the power storage cover is made of a conductive metal.

8. The wire harness routing member according to claim 5, wherein:
   the power storage device is assembled to a lower part of a vehicle frame of the vehicle; and
   when assembled to the vehicle frame, the power storage device is arranged inward of a side of the vehicle frame.

9. The wire harness routing member according to claim 1, wherein the wire harness has at least one auxiliary electric wire arranged along a path different from the continuous electric wire so as to become a redundancy of the continuous electric wire.

10. The wire harness routing member according to claim 1, wherein the holding member has rigidity capable of maintaining shape.

\* \* \* \* \*